US00RE49768E

(19) United States
(12) Reissued Patent
Wang et al.

(10) Patent Number: US RE49,768 E
(45) Date of Reissued Patent: Dec. 26, 2023

(54) WIND POWER CONVERTER DEVICE AND CONVERTER DEVICE

(71) Applicant: DELTA ELECTRONICS, INC., Taoyuan (TW)

(72) Inventors: Chang-Yang Wang, Taoyuan (TW); Li Cai, Taoyuan (TW); Yan-Song Lu, Taoyuan (TW)

(73) Assignee: DELTA ELECTRONICS, INC.

(21) Appl. No.: 16/902,934

(22) Filed: Jun. 16, 2020

Related U.S. Patent Documents

Reissue of:
(64) Patent No.: 10,027,239
Issued: Jul. 17, 2018
Appl. No.: 15/674,512
Filed: Aug. 10, 2017

U.S. Applications:
(62) Division of application No. 14/794,844, filed on Jul. 9, 2015, now Pat. No. 9,768,706.

(30) Foreign Application Priority Data

Sep. 5, 2014 (CN) ..... 201410452474.X
Mar. 3, 2015 (CN) ..... 201510094313.2

(51) Int. Cl.
*H02M 5/45* (2006.01)
*F03D 9/25* (2016.01)
(Continued)

(52) U.S. Cl.
CPC ..... *H02M 5/4505* (2013.01); *F03D 9/255* (2017.02); *H02M 5/45* (2013.01); *H02M 5/452* (2013.01);
(Continued)

(58) Field of Classification Search
CPC ..... H02M 5/4505; H02M 5/45; H02M 5/452; F03D 9/255
See application file for complete search history.

(56) References Cited

U.S. PATENT DOCUMENTS 5,083,039 A * 1/1992 Richardson ..... F03D 7/0272 290/44
5,644,483 A * 7/1997 Peng ..... H02M 7/487 363/132
(Continued)

FOREIGN PATENT DOCUMENTS

CA 2792602 A1 4/2014
CN 1983785 A 6/2007
(Continued)

*Primary Examiner* — Linh M Nguyen
(74) *Attorney, Agent, or Firm* — Hauptman Ham, LLP

(57) ABSTRACT

A wind power converter device is provided. The wind power converter device includes grid side converters, generator side converters and a DC bus module. Each of the grid side converters includes grid side outputs electrically coupled to a grid and a first and a second DC inputs. Each two of the neighboring grid side converters are connected in series at the second and the first DC inputs. Each of the generator side converters includes generator side inputs electrically coupled to a generator device and a first and a second DC outputs. Each two of the neighboring generator side converters are coupled in series at the second and the first DC outputs. The DC bus module is electrically coupled between the grid side converters and the generator side converters.

16 Claims, 12 Drawing Sheets

(51) Int. Cl.
*H02M 5/458* (2006.01)
*H02M 5/452* (2006.01)
*H02M 7/757* (2006.01)
*H02M 1/00* (2006.01)

(52) U.S. Cl.
CPC ..... *H02M 5/4585* (2013.01); *H02M 1/0077* (2021.05); *H02M 7/7575* (2013.01); *Y02E 10/72* (2013.01); *Y02E 10/76* (2013.01)

(56) References Cited

U.S. PATENT DOCUMENTS 6,166,513 A * 12/2000 Hammond ..... H02M 7/49 318/762
8,472,219 B2 6/2013 Srighakollapu et al.
9,444,322 B2 * 9/2016 Park ..... H02M 1/12
9,768,706 B2 * 9/2017 Wang ..... H02M 5/4505
2008/0291708 A1 * 11/2008 Teichmann ..... H02M 1/32 363/50
2009/0121482 A1 5/2009 Rickard
2012/0081058 A1 * 4/2012 Bortolus ..... H02K 11/001 318/490
2012/0163044 A1 * 6/2012 Mayor Miguel ..... H02M 7/49 363/37
2012/0217749 A1 * 8/2012 Castelli Dezza ..... H02P 9/305 290/44
2013/0056985 A1 * 3/2013 Lu ..... F03D 7/0248 290/44
2013/0182465 A1 * 7/2013 Wang ..... H02J 3/381 363/34
2013/0182466 A1 * 7/2013 Lu ..... H02J 3/386 363/34
2013/0234522 A1 * 9/2013 Tan ..... H02M 5/4585 307/72
2013/0249501 A1 * 9/2013 Lu ..... F03D 7/0224 322/21
2013/0272038 A1 10/2013 Wang et al.
2013/0279214 A1 * 10/2013 Takase ..... H02M 7/68 363/37
2013/0279222 A1 * 10/2013 Cai ..... H02M 5/4585 363/78
2014/0021937 A1 * 1/2014 Wang ..... H02M 5/02 323/361
2015/0236603 A1 * 8/2015 Jimichi ..... H02M 5/293 363/37
2016/0069327 A1 * 3/2016 Wang ..... H02M 5/4585 363/37
2016/0211763 A1 * 7/2016 Wang ..... H02M 5/4585
2016/0329832 A1 * 11/2016 Aeloiza ..... H02M 7/493

FOREIGN PATENT DOCUMENTS

CN 101826804 A 9/2010
CN 102882231 A 1/2013
CN 102946118 A 2/2013
CN 103441530 * 12/2013
CN 103606926 A 2/2014
CN 103715708 A 4/2014
DE 102005025422 A1 12/2006
TW I443949 B 7/2014

* cited by examiner

WIND POWER CONVERTER DEVICE AND CONVERTER DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This Application is a Divisional of U.S. application Ser. No. 14/794,844, filed on Jul. 9, 2015, and claims priority to Chinese Application Serial Number 201410452474.X, filed Sep. 5, 2014 and Chinese Application Serial Number 201510094313.2, filed Mar. 3, 2015, which are herein incorporated by reference.

BACKGROUND

Field of Invention

The present invention relates to a converter technology. More particularly, the present invention relates to a wind power converter device and a converter device.

Description of Related Art

Along with the development of the renewable power, technicians focus on the improvement of the wind power converter, which is the core of the wind power generation system. In the field of the electricity-driven frequency converter and the converter for generating power, a multiple of converters are used based on the increasing system capacity. However, a multiple of direct current (DC) buses that extend for a long distance are used to transmit the voltage when a multiple of converters are used. If the cost of the transmission of the energy in the DC component can not be lowered, the efficiency of the whole converter can not be improved. In addition, when the distance between the motor and the generator is longer, i.e. the distance between the converters in the generator side and the converters in the motor side is longer, a multiple of direct current (DC) buses that extend for a long distance are used to transmit the voltage when a multiple of converters are used. If the cost of the transmission of the energy in the DC component can not be lowered, the efficiency of the whole converter can not be improved.

Accordingly, what is needed is a wind power converter device and a converter device to address the issues mentioned above.

SUMMARY

The disclosure provides a wind power converter device. The wind power converter device includes a plurality of grid side converters, a plurality of generator side converters and so a DC bus module. The grid side converters each includes a plurality of grid side outputs electrically coupled to a grid, a first direct current (DC) input and a second DC input, wherein the second DC input of one of any two of the neighboring grid side converters is coupled in series to the first DC input of another one of the two neighboring grid side converters. The generator side converters each includes a plurality of generator side inputs electrically coupled to a generator device, a first DC output and a second DC output, wherein the second DC output of one of any two of the neighboring generator side converters is coupled in series to the first DC output of another one of the two neighboring generator side converters. The DC bus module is electrically coupled between the grid side converters and the generator side converters.

Another aspect of the present disclosure is to provide a wind power converter device. The wind power converter device includes n grid side converters, 2n generator side converters and a DC bus module. The n grid side converters each includes a plurality of grid side outputs electrically coupled to a grid, a first DC input, a middle point input and a second DC input. The 2n generator side converters each includes a plurality of generator side inputs electrically coupled to a generator device, a first DC output and a second DC output, wherein the second DC output of the 2n−1-th generator side converters is coupled in series to the first DC output of the 2n-th generator side converters. The DC bus module is electrically coupled between the grid side converters and the generator side converters, wherein n>=1.

Another aspect of the present disclosure is to provide a wind power converter device. The wind power converter device includes 2n grid side converters, n generator side converters and a DC bus module. The 2n grid side converters each includes a plurality of grid side outputs electrically coupled to a grid, a first DC input and a second DC input, wherein the second DC input of the 2n−1-th grid side converters is coupled in series to the first DC input of the 2n-th grid side converters. Each of the n generator side converters includes a plurality of generator side inputs electrically coupled to a generator device, a first DC output, a middle point output and a second DC output. The DC bus module electrically coupled between the grid side converters and the generator side converters, wherein n>=1.

Another aspect of the present disclosure is to provide a converter device. The converter device includes a plurality of first generator side converters, a plurality of second generator side converters and a DC bus module. The first generator side converters each includes a plurality of motor side outputs electrically coupled to a motor device, a first DC input and a second DC input, wherein the second DC input of one of any two of the neighboring first generator side converters is coupled in series to the first DC input of another one of the two neighboring first generator side converters. The second generator side converters each includes a plurality of generator side inputs electrically coupled to a generator device, a first DC output and a second DC output, wherein the second DC output of one of any two of the neighboring second generator side converters is coupled in series to the first DC output of another one of the two neighboring second generator side converters. The DC bus module is electrically coupled between the first generator side converters and the second generator side converters.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
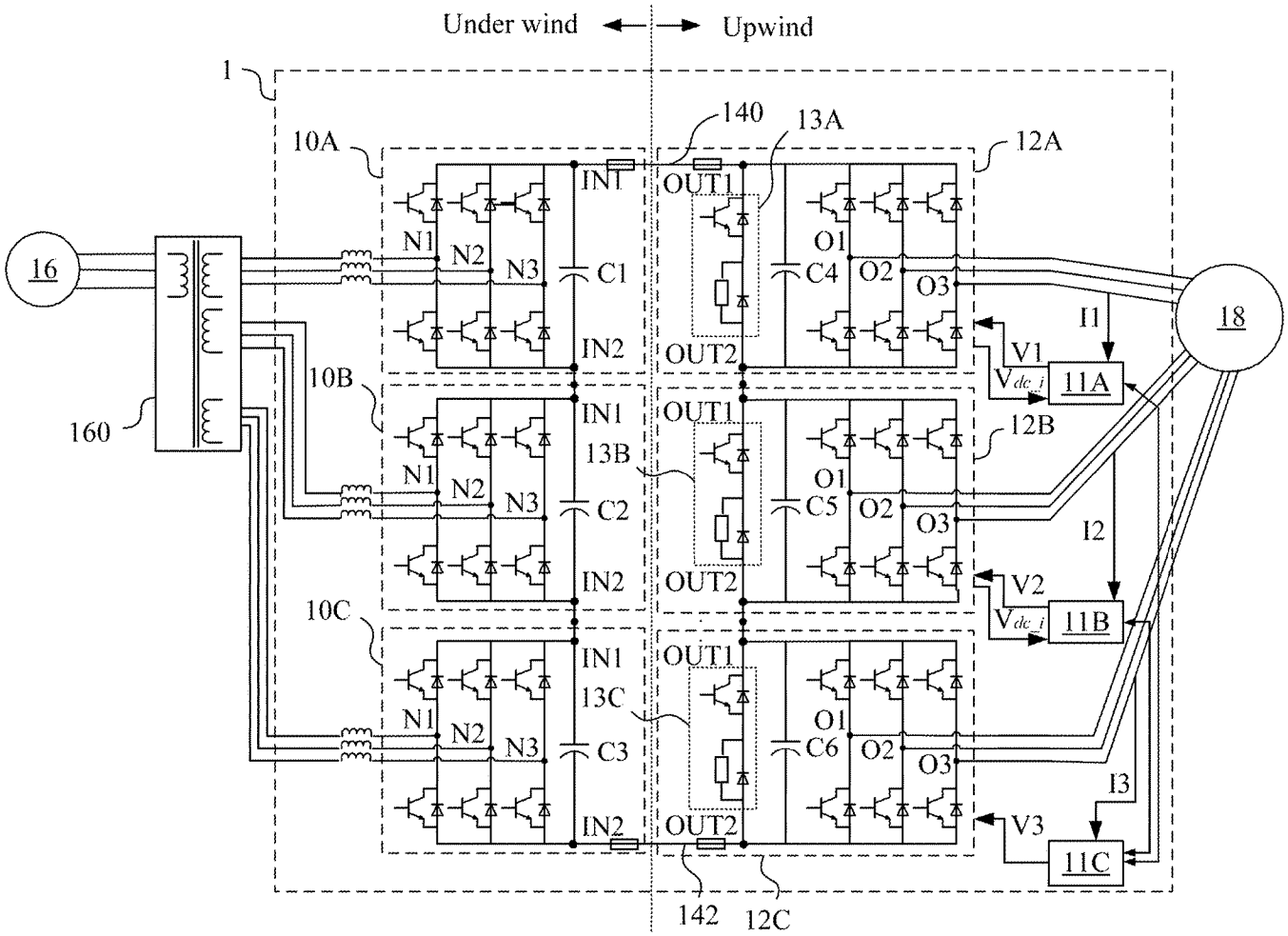
FIG. 1 is a circuit diagram of a wind power converter device in an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is now made to FIG. 1. FIG. 1 is a circuit diagram of a wind power converter device 1 in an embodiment of the present disclosure. The wind power converter device 1 includes grid side converters 10A-10C, generator side converters 12A-12C and a DC bus module. The grid side converters 10A-10C and the generator side converters 12A-12C are respectively disposed in the up part of the tower and the under part of the tower (Under Wind). The generator side converters 12A-12C are disposed in a room of the top of the tower of the wind power converter device 1 (Upwind). The grid side converters 10A-10C are disposed in the bottom or outside of the tower of the wind power converter device 1. The cost of the cables for transmitting power between the grid side converters 10A-10C and the generator side converters 12A-12C can be reduced. The loading of the weight of the up part of the tower can be distributed equally as well.

In an embodiment, all the grid side converters 10A-10C include identical components. Take the grid side converter 10A as an example, the grid side converter 10A in the present embodiment is a two-level converter and includes grid side outputs (e.g. three grid side outputs) N1-N3 electrically coupled to the grid 16, a first DC input IN1 and a second DC input IN2. In an embodiment, the grid side outputs N1-N3 are electrically coupled to the grid 16 through a voltage transformer 160.

The second DC input IN2 of one of any two of the neighboring grid side converters 10A-10C is coupled in series to the first DC input IN1 of another one of the two neighboring grid side converters 10A-10C. Take the grid side converters 10A and 10B as an example, the second DC input IN2 of the grid side converter 10A is coupled in series to the first DC input IN1 of the grid side converter 10B. Similarly, the second DC input IN2 of the grid side converter 10B is coupled in series to the first DC input IN1 of the grid side converter 10C.

In an embodiment, the number of the generator side converters 12A-12C is the same as the number of the grid side converters 10A-10C. Further, all the generator side converters 12A-12C may include the identical components. Take the generator side converter 12A as an example, the generator side converter 12A in the present embodiment is a two-level converter and includes generator side inputs (e.g. three generator side inputs) O1-O3 electrically coupled to the generator device 18, a first DC output OUT1 and a second DC output OUT2. In an embodiment, the generator device 18 is a permanent magnet synchronous generator device, an excitation synchronous generator device or an induction generator having a multiple groups of windings. Each group of the windings includes three windings (not illustrated). Take the generator side converter 12A as an example, the three windings of each group of windings in the generator device 18 in the present embodiment are respectively coupled to the generator side inputs O1-O3. In an embodiment, the generator side converters 12A-12C are electrically coupled to the generator device 18 through a filtering circuit (not illustrated) that includes such as an inductor or a capacitor.

The second DC output OUT2 of one of any two of the neighboring generator side converters 12A-12C is coupled in series to the first DC output OUT1 of another one of the two neighboring generator side converters 12A-12C. Take the generator side converters 12A and 12B as an example, the second DC output OUT2 of the generator side converter 12A is coupled in series to the first DC output OUT1 of the generator side converter 12B. Similarly, the second DC output OUT2 of the generator side converter 12B is coupled in series to the first DC output OUT1 of the generator side converter 12C.

The DC bus module in the present embodiment includes only two buses 140 and 142 corresponding to the two grid side converters 10A and 10C and the two generator side converters 12A and 12C. The bus 140 is electrically coupled to the first DC input IN1 of the grid side converter 10A and the first DC output OUT1 of the generator side converters 12A. The bus 142 is electrically coupled to the second DC input IN2 of the grid side converter 10C and the second DC output OUT2 of the generator side converters 12C. The DC bus is not disposed between each pair of the first DC input IN1, the first DC output OUT1, the second DC input IN2 and the second DC output OUT2 that corresponds to the intermediate grid side converter and generator side converter.

In an embodiment, the DC bus module further include bus capacitors C1-C6 each electrically coupled between the first DC inputs IN1 and the second DC inputs IN2 of the grid side converters 10A-10C and between the first DC outputs OUT1 and the second DC outputs OUT2 of the generator side converters 12A-12C to support the voltages of these terminals.

In an embodiment, the wind power converter device 1 further includes chopper circuits 13A, 13B and 13C each disposed at the two ends of the bus capacitors C4, C5 and C6 to perform a voltage balancing protection to the generator side converters 12A-12C. Take the chopper circuit 13A as an example, the chopper circuit 13A includes a controllable power semiconductor switch, a resistor and two diodes. The collector of the controllable power semiconductor switch electrically connects the cathode of one diode and one terminal of the bus capacitor C4, and the emitter of the controllable power semiconductor switch electrically connects the anode of the diode. One terminal of the resistor connects the emitter of the controllable power semiconductor switch and the other terminal of the resistor connects the other terminal of the bus capacitor C4. The other diode connects the resistor in parallel. In some embodiments, the wind power converter device 1 further includes chopper circuits each electrically coupled to the two ends of each of the bus capacitors between the first and the second DC inputs of each of the grid side converters or between the two ends of each of the bus capacitors of the bus capacitors between the first and the second DC outputs of the generator side converters to perform a voltage balancing protection to the grid side converters and the generator side converters.

Therefore, the wind power converter device 1 of the present disclosure can connect the grid side converters 10A-10C in series by electrically coupling the first DC input IN1 and the second DC input IN2 of any two neighboring grid side converters 10A-10C, and can connect the generator side converters 12A-12C in series by electrically coupling the first DC output OUT1 and the second DC output OUT2 of any two neighboring generator side converters 12A-12C.

Further, since the buses 140 and 142 are only disposed between the first DC input IN1 of the grid side converter 10A and the first DC output OUT1 of the generator side converter 12A and between the second DC input IN2 of the grid side converter 10C and the second DC output OUT2 of the generator side converter 12C, the DC voltages of the grid side converters and the generator side converters can be adjusted according to the number of the grid side converters and the generator side converters coupled in series. The design of the wind power converter device 1 can be more flexible. The number of the DC buses between the grid side converters 10A-10C and the generator side converters 12A-12C and the cost can be reduced.

In an embodiment, the generator side converters 12A-12C illustrated in FIG. 1 include a primary generator side converter and a plurality of secondary generator side converters. In an embodiment, the generator side converter 12C can be assigned to be the primary generator side converter, such that the generator side converters 12A and 12B become the secondary generator side converters.

The detail description of the control mechanism of the primary generator side converter and the secondary generator side converters is illustrated in the following paragraphs.

The wind power converter device 1 further includes secondary generator side control modules 11A and 11B and the primary generator side control module 11C corresponding to the secondary generator side converters 12A and 12B and the primary generator side converter 12C respectively.

The secondary generator side control modules 11A and 11B respectively receive three phase secondary input current amounts I1-I2 corresponding to the generator side inputs O1-O3 of the corresponding secondary generator side converters 12A and 12B, a secondary DC voltage amount $V_{dc_i}$ (i.e. the DC bus voltage) corresponding to the first and the second DC outputs OUT1 and OUT2 of the corresponding secondary generator side converters 12A and 12B and a second axis general given current component $i_{q_norm*}$ outputted from the primary generator side converter 12C to generate three phase secondary voltage control signals V1-V2 accordingly to control the corresponding secondary generator side converters 12A and 12B. Each of the secondary generator side control modules 11A and 11B generates a second axis secondary independent given current component $i_{q\text{-}i*}$ according to the corresponding secondary DC voltage amount $V_{dc_i}$.

In an embodiment, both of the secondary generator side control modules 11A and 11B include identical architecture. The detail description is made by using the secondary generator side control module 11A as the example.

Figure 2:
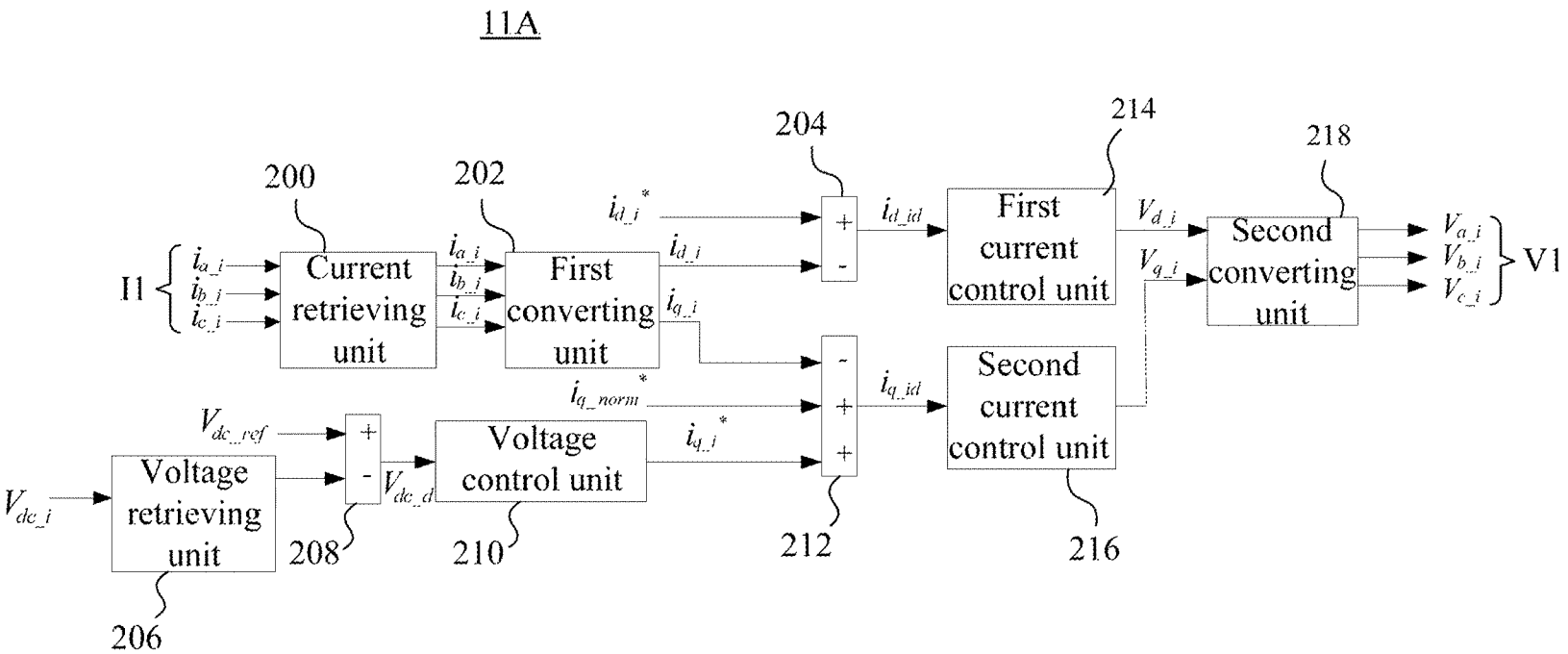
FIG. 2 is a block diagram of the secondary generator side control module in an embodiment of the present disclosure.

Reference is now made to FIG. 2. FIG. 2 is a block diagram of the secondary generator side control module 11A in an embodiment of the present disclosure. The secondary generator side control module 11A includes a current retrieving unit 200, a first converting unit 202, a first computing unit 204, a voltage retrieving unit 206, a voltage difference computing unit 208, a voltage control unit 210, a second computing unit 212, a first current control unit 214, a second current control unit 216 and a second converting unit 218.

The current retrieving unit 200 is electrically coupled to the generator side inputs O1-O3 of the secondary generator side converter 12A to retrieve the three phase secondary input current amount I1. In an embodiment, the three phase secondary input current amount I1 includes three components $i_{a_i}$, $i_{b_i}$ and $i_{c_i}$.

The first converting unit 202 is configured to convert the three components $i_{a_i}$, $i_{b_i}$ and $i_{c_i}$ of the three phase secondary input current amount I1 to a first axis secondary current component $i_{q_i}$ and a second axis secondary current component $i_{q_i}$. In an embodiment, the first converting unit 202 includes a dq rotation coordinate that comprises a d axis and a q axis. The first axis secondary current component corresponds to the d axis of the dq rotation coordinate and the second axis secondary current component $i_{q_i}$ corresponds to the q axis of the dq rotation coordinate. In an embodiment, the first axis secondary current component $i_{d_i}$ is a reactive current component and the second axis secondary current component $i_{q_i}$ is an active current component.

The first computing unit 204 is configured to perform computation to generate a first axis difference $i_{d_id}$ according to the first axis secondary current component $i_{i_i}$ and a first axis secondary independent given current component $i_{d_i}$. The first axis secondary independent given current component $i_{d_i*}$ can be a predetermined value stored in the secondary generator side control module 11A.

The voltage retrieving unit 206 is configured to retrieve the secondary DC voltage amount $V_{dc_i}$ from the first and the second DC outputs OUT1 and OUT2 of the secondary generator side converter 12A. The voltage difference computing unit 208 is configured to perform computation to generate a voltage difference $V_{dc_d}$ according to the secondary DC voltage amount $V_{dc_i}$ and a referent voltage amount $V_{dc_ref}$. The referent voltage amount $V_{dc_ref}$ can be a predetermined value stored in the secondary generator side control module 11A. Further, the voltage control unit 210 is configured to generate the second axis secondary independent given current component $i_{q_i*}$ according to the voltage difference $V_{dc_d}$.

The second computing unit 212 is configured to perform computation to generate a second axis difference $i_{q_id}$ according to the second axis secondary current component $i_{q_i}$, the second axis general given current component $i_{q_norm*}$ and the second axis secondary independent given current component $i_{q_i*}$.

The first current control unit 214 is configured to generate a first axis secondary voltage control signal $V_{d_i}$ according to the first axis difference $i_{d_id}$. The second current control unit 216 is configured to generate a second axis secondary voltage control signal $V_{q_i}$ according to the second axis difference $i_{q_id}$. The second converting unit 218 is configured to convert the first axis secondary voltage control signal $V_{d_i}$ and the second axis secondary voltage control signal $V_{q_i}$ to the three phase secondary voltage control signal V1.

In an embodiment, the three phase secondary voltage control signal V1 includes three components $V_{a_i}$, $V_{b_i}$ and $V_{c_i}$. In an embodiment, each of the three components $V_{a\text{-}i}$, $V_{b_i}$ and $V_{c_i}$ can be a pulse width modulation (PWM) signal.

Therefore, by using the three phase secondary voltage control signal V1 to control the semiconductor switches in the secondary generator side converter 12A to be turned on or turned off, the secondary generator side converter 12A operates in either a rectifying state, an inverting state or a non-operation state.

It is noted that the secondary generator side control module 11B can also generates the three phase secondary voltage control signal V2 according to the three phase secondary input current amount 12, the second axis general given current component $i_{q_norm*}$ and the secondary DC voltage amount $V_{dc_i}$. However, the first axis secondary independent given current component $i_{d_i*}$ and the second axis secondary independent given current component $i_{q_i*}$ that correspond to the secondary generator side control module 11B can be independent from those that correspond to the secondary generator side control module 11A. And the second axis general given current component $i_{q\text{-}norm*}$ can be used in both of the secondary generator side control modules 11A and 11B.

Figure 3:
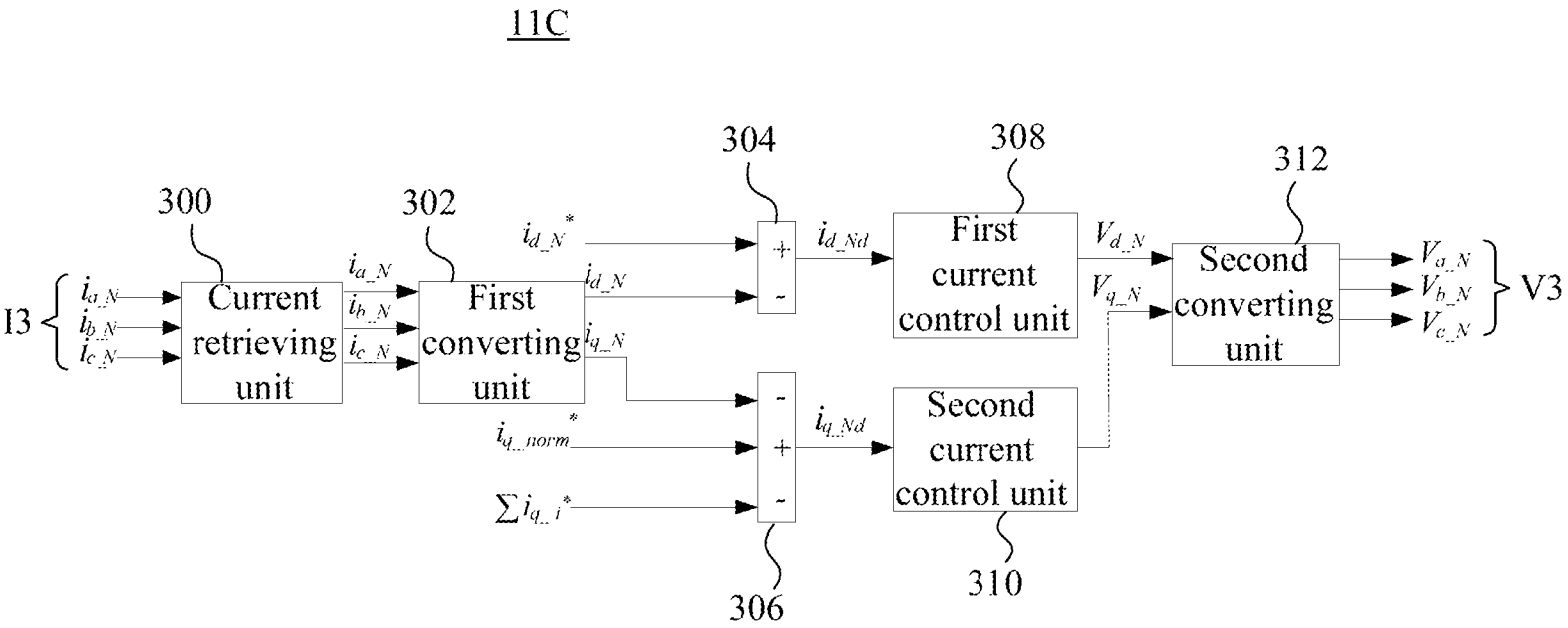
FIG. 3 is a block diagram of the primary generator side control module in an embodiment of the present disclosure.

Reference is now made to FIG. 3. FIG. 3 is a block diagram of the primary generator side control module 11C in an embodiment of the present disclosure. The primary generator side control module 11C includes a current retrieving unit 300, a first converting unit 302, a first computing unit 304, a second computing unit 306, a first current control unit 308, a second current control unit 310, a second converting unit 312.

The current retrieving unit 300 is electrically coupled to the generator side inputs O1-O3 of the primary generator side converter 12C to retrieve the three phase primary input current amount I3. In an embodiment, the three phase primary input current amount I3 includes three components $i_{a_N}$, $i_{b_N}$ and $i_{c_N}$.

The first converting unit 302 is configured to convert the three components $i_{a\text{-}N}$, $i_{b_N}$ and $i_{c_N}$ of the three phase primary input current amount I3 to a first axis secondary current component $i_{d_N}$ and a second axis secondary current component $i_{q_N}$. In an embodiment, the first converting unit 302 includes a dq rotation coordinate that comprises a d axis and a q axis. The first axis primary current component $I_{d\text{-}N}$ corresponds to the d axis of the dq rotation coordinate and the second axis primary current component $i_{q_N}$ corresponds to the q axis of the dq rotation coordinate. In an embodiment, the first axis primary current component $i_{d_N}$ is a reactive current component and the second axis primary current component $i_{q_N}$ is an active current component.

The first computing unit 304 is configured to perform computation to generate a first axis difference $i_{d_Nd}$ according to the first axis primary current component $i_{d_N}$ and a first axis primary independent given current component $i_{d_N*}$.

The second computing unit 306 is configured to perform computation to generate a second axis difference $i_{q_Nd}$ according to the second axis primary current component $i_{q_N}$, a total second axis secondary independent given current $\Sigma i_{q_i*}$ and a second axis general given current component $i_{q_norm*}$. In an embodiment, the total second axis secondary independent given current $\Sigma i_{q_i*}$ is the sum of the second axis secondary independent given currents $i_{q\text{-}i*}$ of all the secondary generator side control modules 11A and 11B.

The first current control unit 308 is configured to generate a first axis primary voltage control signal $V_{d_N}$ according to the first axis difference $i_{d_Nd}$. The second current control unit 310 is configured to generate the second axis primary voltage control signal $V_{q_N}$ according to the second axis difference $i_{q_Nd}$. The second converting unit 312 is configured to convert the first axis primary voltage control signal $V_{d_N}$ and the second axis primary voltage control signal $V_{q_N}$ to the three phase primary voltage control signal V3. In an embodiment, the three phase primary voltage control signal V3 includes three components $V_{a_N}$, $V_{b_N}$ and $V_{c_N}$. In an embodiment, each of the three components $V_{a_N}$, $V_{b_N}$ and $V_{c_N}$ can be a pulse width modulation (PWM) signal.

Therefore, by using the three phase secondary voltage control signal V3 to control the semiconductor switches in the primary generator side converter 12C to be turned on or turned off, the primary generator side converter 12C operates in either a rectifying state, an inverting state or a non-operation state.

It is noted that the primary generator side control module 11C and the secondary generator side control modules 11A and 11B can perform communication by using various possible forms signal transmission formats. The primary generator side control module 11C delivers the second axis general given current component $i_{q_norm*}$ to the secondary generator side control modules 11A and 11B. The secondary generator side control modules 11A and 11B deliver the second axis secondary independent given currents $i_{q_i*}$ to the primary generator side control module 11C. In an embodiment, the primary generator side control module 11C performs addition operation on the second axis secondary independent given currents $i_{q_i*}$ delivered by the secondary generator side control modules 11A and 11B to generate the total second axis secondary independent given current $\Sigma i_{q_i*}$.

Therefore, by using the method described above, the wind power converter device 1 perform efficient control on the primary generator side converter 12C and the secondary generator side converters 12A and 12B according to the operation of the primary generator side control module 11C and the secondary generator side control modules 11A and 11B.

Figure 4:
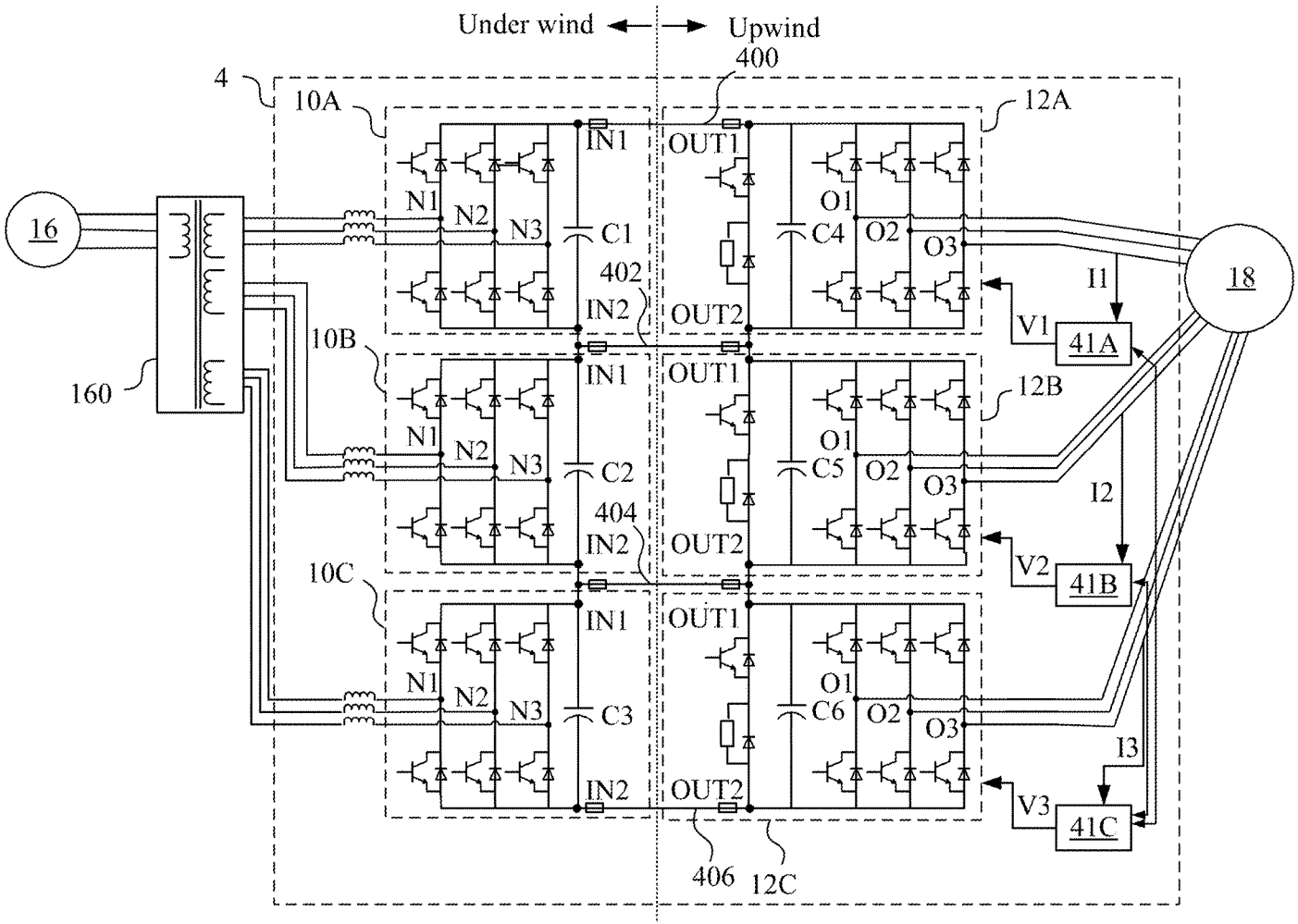
FIG. 4 is a circuit diagram of a wind power converter device in an embodiment of the present disclosure.

Reference is now made to FIG. 4. FIG. 4 is a circuit diagram of a wind power converter device 4 in an embodiment of the present disclosure. The wind power converter device 4 includes grid side converters 10A-10C, generator side converters 12A-12C and a DC bus module. Similar to the wind power converter device 1 illustrated in FIG. 1, the grid side converters 10A-10C of the wind power converter device 4 are connected in series and the generator side converters 12A-12C are connected in series. Most of the components included in the wind power converter device 4 are identical to those included in the wind power converter device 1. As a result, only the description of components in the wind power converter device 4 that are different from those in the wind power converter device 1 is made.

In the present embodiment, the DC bus module includes DC buses 400, 402, 404 and 406. The DC bus 400 is electrically coupled to the first DC input IN1 of the grid side converter 10A and the first DC output OUT1 of the generator side converter 12A. The DC bus 402 is electrically coupled to the second DC input IN2 of the grid side converter 10A and the second DC output OUT2 of the generator side converter 12A (which is equivalent to the first DC input IN1 of the grid side converter 10B and the first DC output OUT1 of the generator side converter 12B).

The DC bus 404 is electrically coupled to the second DC input IN2 of the grid side converter 10B and the second DC output OUT2 of the generator side converter 12B (which is equivalent to the first DC input IN1 of the grid side converter 10C and the first DC output OUT1 of the generator side converter 12C).

The DC bus 406 is electrically coupled to the second DC input IN2 of the grid side converter 10C and the second DC output OUT2 of the generator side converter 12C.

The detail description of the control mechanism of the generator side converters 12A-12C is illustrated in the following paragraphs.

The wind power converter device 4 further includes generator side control modules 41A-41C each corresponding to one of the generator side converters 12A-12C. The generator side control modules 41A-41C generate three phase voltage control signals V1-V3 according to three phase input current amounts I1-I3 corresponding to the generator side inputs O1-O3 of the corresponding generator side converters 12A and 12C and the second axis general given current component $i_{q_norm*}$. In an embodiment, the generator side control modules 41A-41C include identical architecture. The detail description is made by using the generator side control module 41A as the example.

Figure 5:
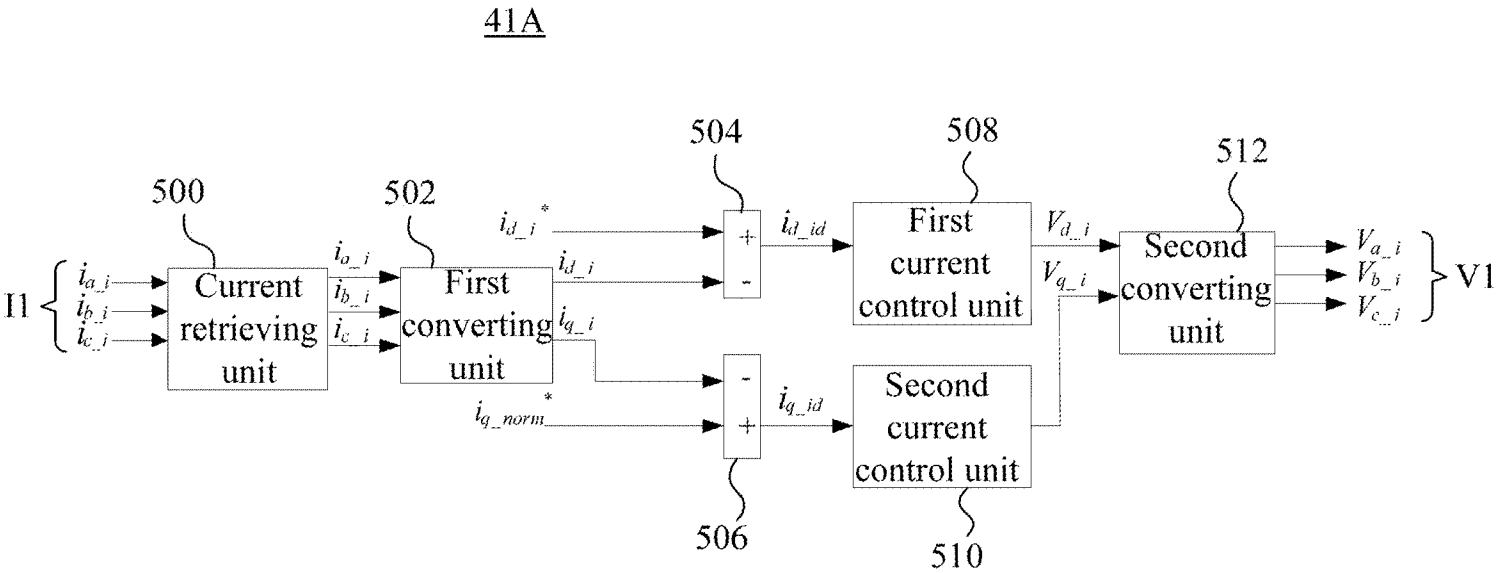
FIG. 5 is a block diagram of the generator side control module in an embodiment of the present disclosure.

Reference is now made to FIG. 5. FIG. 5 is a block diagram of the generator side control module 41A in an embodiment of the present disclosure. The generator side control module 41A includes a current retrieving unit 500, a first converting unit 502, a first computing unit 504, a second computing unit 506, a first current control unit 508, a second current control unit 510 and a second converting unit 512.

The current retrieving unit 500 is electrically coupled to the generator side inputs O1-O3 of the generator side converter 12A to retrieve the three phase input current amount I1. In an embodiment, the three phase input current amount I1 includes three components $i_{a_i}$, $i_{b_i}$ and $i_{c_i}$.

The first converting unit 502 is configured to convert the three components $i_{a_i}$, $i_{b_i}$ and $i_{c_i}$ of the three phase input current amount I1 to a first axis current component $i_{d_i}$ and a second axis current component $i_{g_i}$. In an embodiment, the first converting unit 502 includes a dq rotation coordinate that comprises a d axis and a q axis. The first axis current component corresponds to the d axis of the dq rotation coordinate and the second axis current component $i_{q_i}$ corresponds to the q axis of the dq rotation coordinate. In an embodiment, the first axis current component is a reactive current component and the second axis current component $i_{q_j}$ is an active current component.

The first computing unit 504 is configured to perform computation to generate a first axis difference $i_{d_id}$ according to the first axis current component and a first axis independent given current component $i_{d_i*}$.

The second computing unit 506 is configured to perform computation to generate a second axis difference $i_{q__id}$ according to the second axis current component $i_{q_i}$ and the second axis general given current component $i_{q_norm*}$. In the present embodiment, the second axis general given current component $i_{q_norm*}$ is provided by an external control module (not illustrated). The generator side control module 41A can deliver the second axis general given current component $i_{q_norm*}$ received from the external control module to the generator side control modules 41B and 41C. In the present embodiment, the generator side control module 41A performs communication with the generator side control modules 41B and 41C. In other embodiments, the second axis general given current component $i_{q_norm*}$ can be received by the generator side control module 41B or 41C from the external control module and can be delivered to other generator side control modules.

The first current control unit 508 is configured to generate a first axis voltage control signal $V_{d_i}$ according to the first axis difference $i_{d_d}$. The second current control unit 510 is configured to generate a second axis voltage control signal $V_{q_i}$ according to the second axis difference $i_{d_id}$. The second converting unit 512 is configured to convert the first axis voltage control signal $V_{d_i}$ and the second axis voltage control signal $V_{q_i}$ to the three phase voltage control signal V1. In an embodiment, the three phase voltage control signal V1 includes three components $V_{a_i}$, $V_{b_i}$ and $V_{c_i}$. In an embodiment, each of the three components $V_{a_i}$, $Vb_{_i}$ and $V_{c_i}$ can be a pulse width modulation (PWM) signal.

Therefore, by using the three phase voltage control signal V1 to control the semiconductor switches in the generator side converter 12A to be turned on or turned off, the secondary generator side converter 12A operates in either a rectifying state, an inverting state or a non-operation state. The wind power converter device 4 can perform efficient control on the generator side converters 12A-12C through the generator side control modules 41A-41C by using the method described above.

Figure 6:
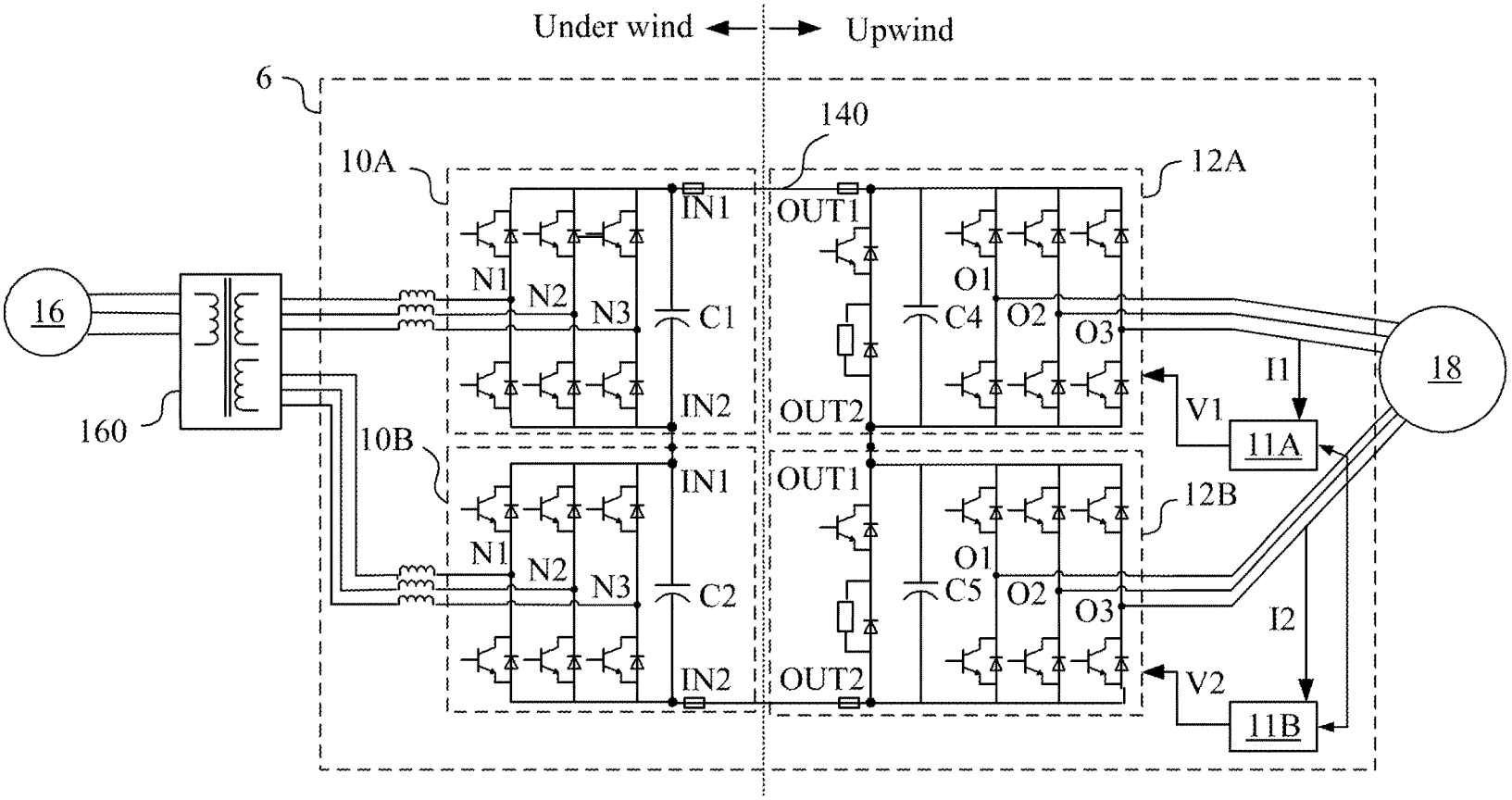
FIG. 6 is a circuit diagram of a wind power converter device in an embodiment of the present disclosure.

Reference is now made to FIG. 6. FIG. 6 is a circuit diagram of a wind power converter device 6 in an embodiment of the present disclosure. The wind power converter device 6 includes grid side converters 10A-10B, generator side converters 12A-12B and a DC bus module. Similar to the wind power converter device 1 illustrated in FIG. 1, the grid side converters 10A-10B of the wind power converter device 6 are connected in series and the generator side converters 12A-12B are connected in series. Most of the components included in the wind power converter device 6 are identical to those included in the wind power converter device 1. The only difference is that both the number of the grid side converters 10A-10B and the generator side converters 12A-12B is two.

Most of the components included in the wind power converter device 6 are identical to those included in the wind power converter device 1. The difference is that the DC bus module further includes an intermediate DC bus electrically coupled between the second DC input IN2 of the grid side converter 10A and the second DC output OUT2 of the generator side converter 12A.

It is noted that in addition to the examples that include the grid side converters and the generator side converters having the number of three or two, the wind power converter device may include more number of grid side converters and the generator side converters in other embodiments and can accomplish an efficient control mechanism by using the method described above.

Figure 7:
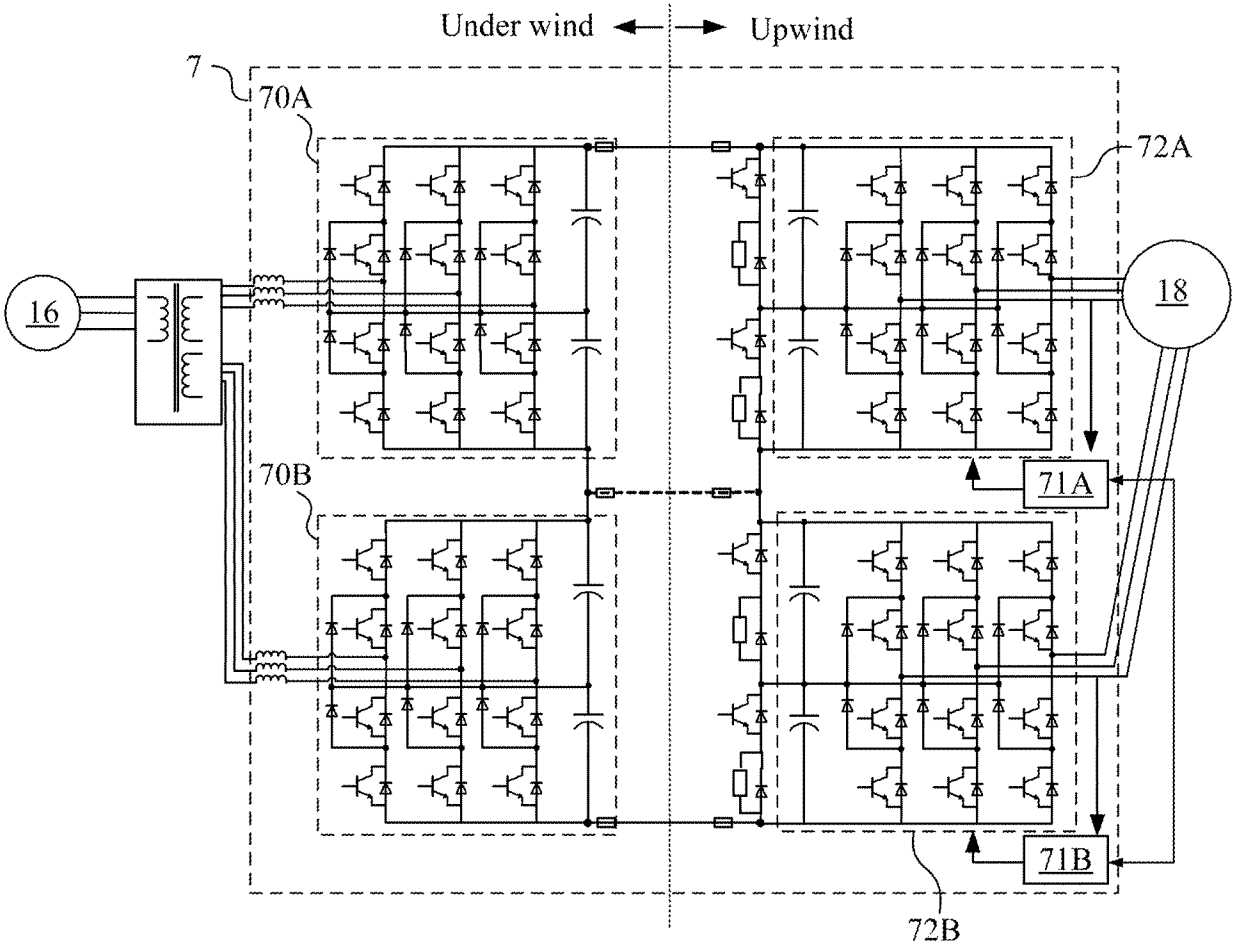
FIG. 7 is a circuit diagram of a wind power converter device in an embodiment of the present disclosure.

Reference is now made to FIG. 7. FIG. 7 is a circuit diagram of a wind power converter device 7 in an embodiment of the present disclosure.

The architecture of the wind power converter device 7 is identical to that of the wind power converter device 6 illustrated in FIG. 6. The grid side converters 70A-70B included in the wind power converter device 7 are connected in series and the generator side converters 72A-72B included in the wind power converter device 7 are connected in series. The difference between the wind power converter device 7 and the wind power converter device 6 is that the grid side converters 70A-70B and the generator side converters 72A-72B included in the wind power converter device 7 are three-level converters. The generator side control modules 71A and 71B included in the wind power converter device 7 can use the method described above to control the generator side converters 72A-72B.

Similarly, the architecture of the three-level converters can be used in the wind power converter device 1 illustrated in FIG. 1 as well.

Figure 8:
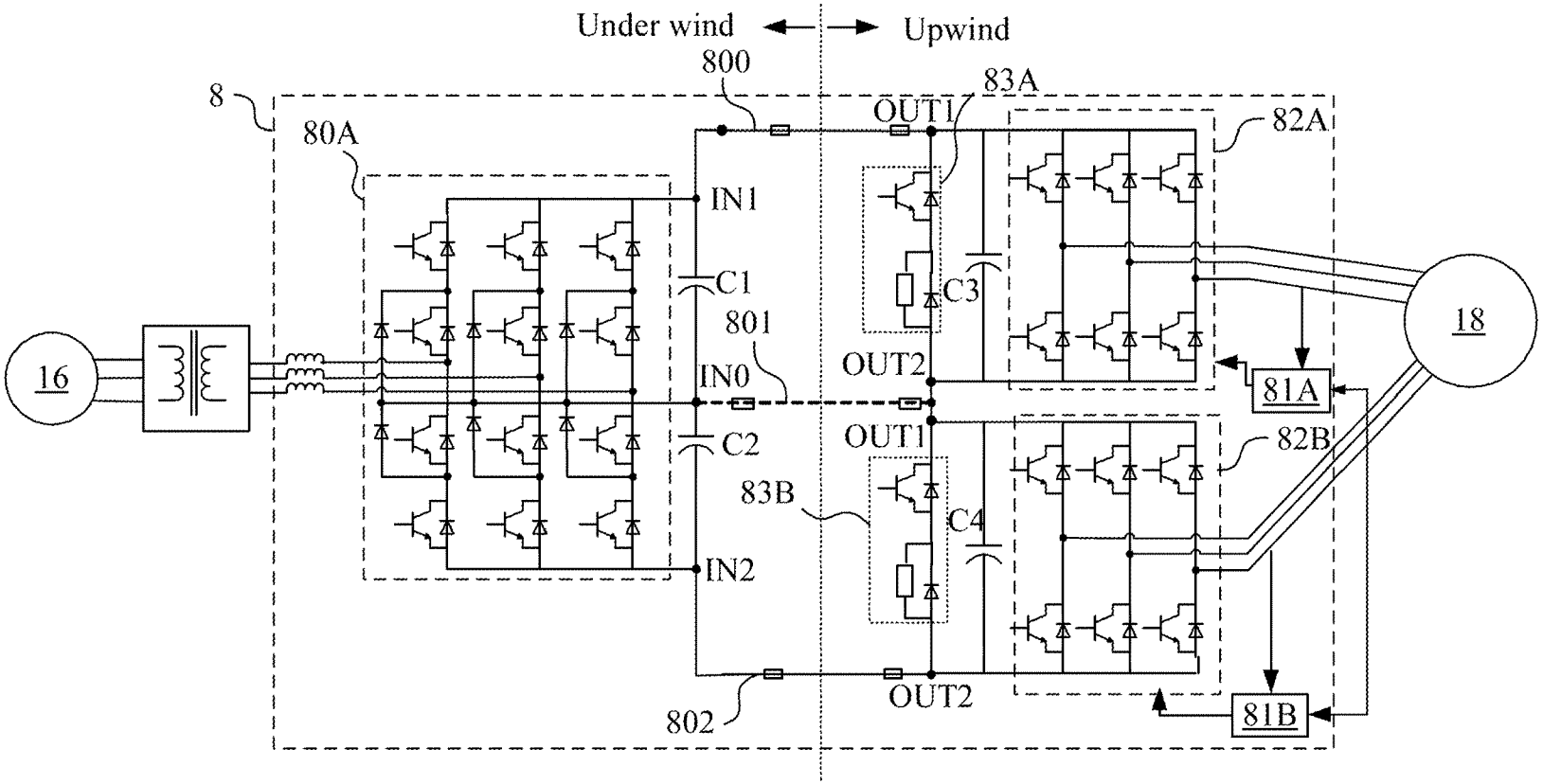
FIG. 8 is a circuit diagram of a wind power converter device in an embodiment of the present disclosure.

Reference is now made to FIG. 8. FIG. 8 is a circuit diagram of a wind power converter device 8 in an embodiment of the present disclosure.

The wind power converter device 8 includes a grid side converter 80A, generator side converters 82A-82B and a DC bus module. The generator side converters 82A-82B are connected in series. However, the grid side converter 80A in the wind power converter device 8 is a three-level converter. The generator side converters 82A-82B are two-level converters. The second DC output OUT2 of the generator side converter 82A and the first DC output OUT1 of the generator side converter 82B are coupled in series. In the present embodiment, the DC bus module includes two DC buses 800 and 802 corresponding to the generator side converters 82A and 82B and the grid side converter 80A. The DC bus 800 is electrically coupled to the first DC output OUT1 of the generator side converter 82A and the first DC input IN1 of the grid side converter 80A. The DC bus 802 is electrically coupled to the second DC output OUT2 of the generator side converter 82B and the second DC input IN2 of the grid side converter 80A. No DC bus is disposed between the second DC output OUT2 of the generator side converter 82A and the first DC output OUT1 of the generator side converter 82B and the intermediate input IN0 of the grid side converter 80A. In the present embodiment, the generator side control modules 81A and 81B included in the wind power converter device 8 can use the methods described in FIG. 2 and FIG. 3 to control the generator side converters 82A-82B.

In an embodiment, the DC bus module further include bus capacitors C1-C4 each electrically coupled between the first DC input IN1 and the intermediate input IN0 of the grid side converter 80A, between the intermediate input IN0 and the second DC inputs IN2 of the generator side converters 80A, and between the first DC output OUT1 and the second DC output OUT2 of the generator side converters 82A-82B to support the voltages of these terminals.

In an embodiment, the wind power converter device 8 further includes chopper circuits 83A and 83B. The chopper circuits 83A and 83B are respectively disposed between the two ends of the bus capacitor C3 and the two ends of the bus capacitor C4 to perform a voltage balancing protection to the generator side converters 82A-82B.

In an embodiment, the wind power converter device is similar to the wind power converter device 8 illustrated in FIG. 8 but includes the DC bus module that has the DC buses 800, 801 and 802. The DC bus 800 is electrically coupled to the first DC input IN1 of the grid side converter 80A and the first DC output OUT1 of the generator side converter 82A. The DC bus 801 is electrically coupled to the intermediate input IN0 of the grid side converter 80A and the second DC output OUT2 of the generator side converter 82A. The DC bus 802 is electrically coupled to the second DC input IN2 of the grid side converter 80A and the second DC output OUT2 of the generator side converter 82B. The generator side control modules 81A and 81B included in the wind power converter device 8 can use the method described in FIG. 5 to control the generator side converters 82A-82B.

Similarly, such an asymmetrical architecture can be used in the wind power converter device 1.

Figure 9:
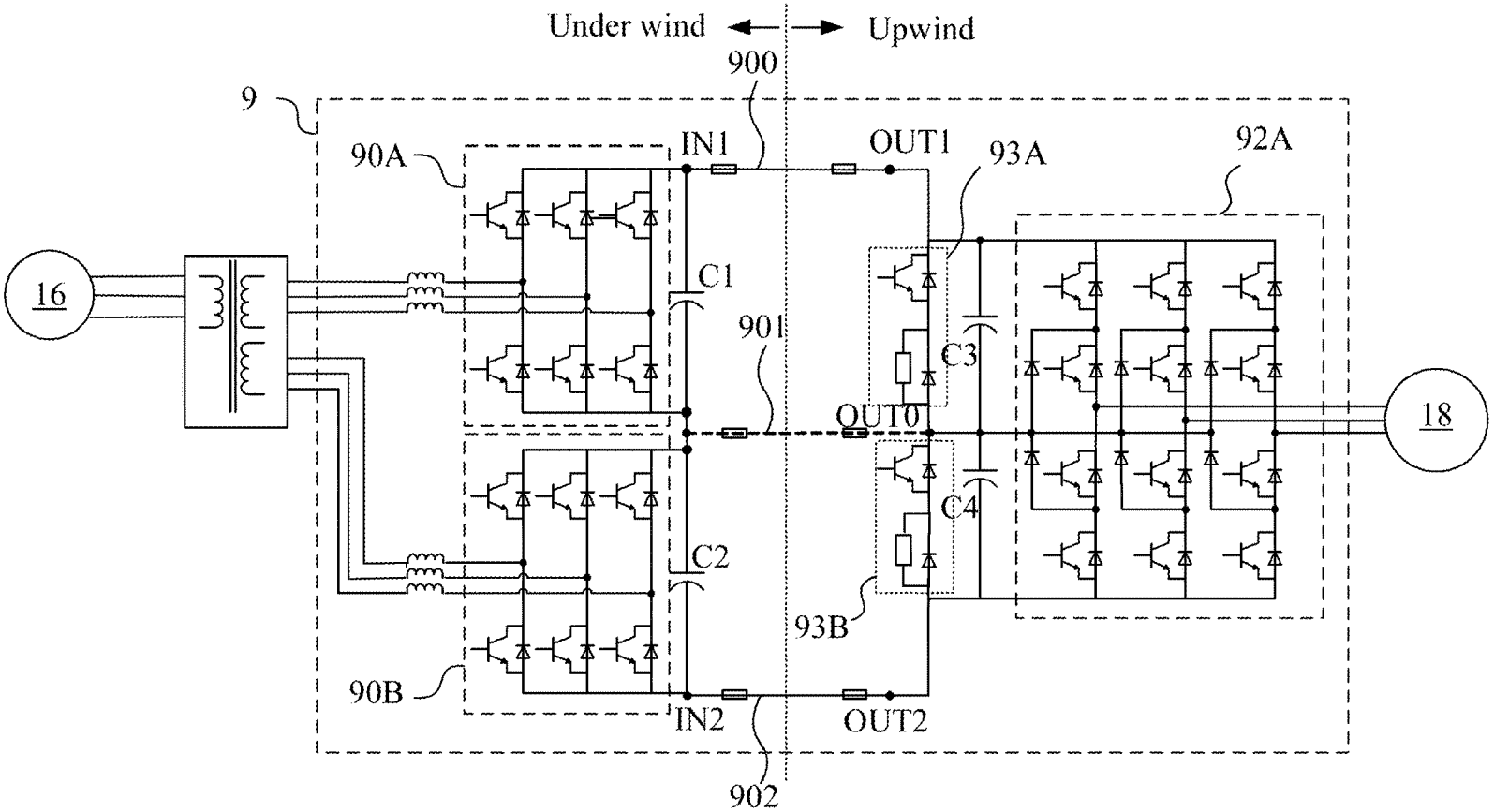
FIG. 9 is a circuit diagram of a wind power converter device in an embodiment of the present disclosure.

Reference is now made to FIG. 9. FIG. 9 is a circuit diagram of a wind power converter device 9 in an embodiment of the present disclosure.

The wind power converter device 9 includes grid side converters 90A-90B, a generator side converter 92A and a DC bus module. The grid side converters 90A-90B are connected in series. However, the generator side converter 92A in the wind power converter device 9 is a three-level converter. The grid side converters 90A-90B are two-level converters. In the present embodiment, the DC bus module includes two DC buses 900 and 902 corresponding to the grid side converters 90A-90B and the generator side converter 92A. The DC bus 900 is electrically coupled to the first DC input IN1 of the grid side converter 90A and the first DC output OUT1 of the generator side converter 92A. The DC bus 902 is electrically coupled to the second DC input IN2 of the grid side converter 90B and the second DC output OUT2 of the generator side converter 92A. The DC bus is not disposed between the second DC input IN2 of the grid side converter 90A and the first DC input IN1 of the grid side converter 90B and the intermediate output OUT0 of the generator side converter 92A.

In an embodiment, the wind power converter device is similar to the wind power converter device 9 illustrated in FIG. 9 but includes the DC bus module that has the DC buses 900, 901 and 902. The DC bus 900 is electrically coupled to the first DC input IN1 of the grid side converter 90A and the first DC output OUT1 of the generator side converter 92A. The DC bus 901 is electrically coupled to the second DC input IN2 of the grid side converter 90A and the first DC input IN1 of the grid side converter 90B and the intermediate output OUT0 of the generator side converter 92A. The DC bus 902 is electrically coupled to the second DC input IN2 of the grid side converter 90B and the second DC output OUT2 of the generator side converter 92A.

In an embodiment, the DC bus module further include bus capacitors C1-C4 each electrically coupled between the first DC input IN1 and the second DC input IN2 of the grid side converter 90A, between the first DC input IN1 and the second DC input IN2 of the grid side converter 90B and between the first DC output OUT1, the intermediate output OUT0 and the second DC output OUT2 of the generator side converter 92A to support the voltages of these terminals.

In an embodiment, the wind power converter device 9 further includes chopper circuits 93A and 93B. The chopper circuits 93A and 93B are respectively disposed between the two ends of the bus capacitor C3 and the two ends of the bus capacitor C4 to perform a voltage balancing protection to the generator side converter 92A.

Similarly, such an asymmetrical architecture can be used in the wind power converter device 1.

Figure 10:
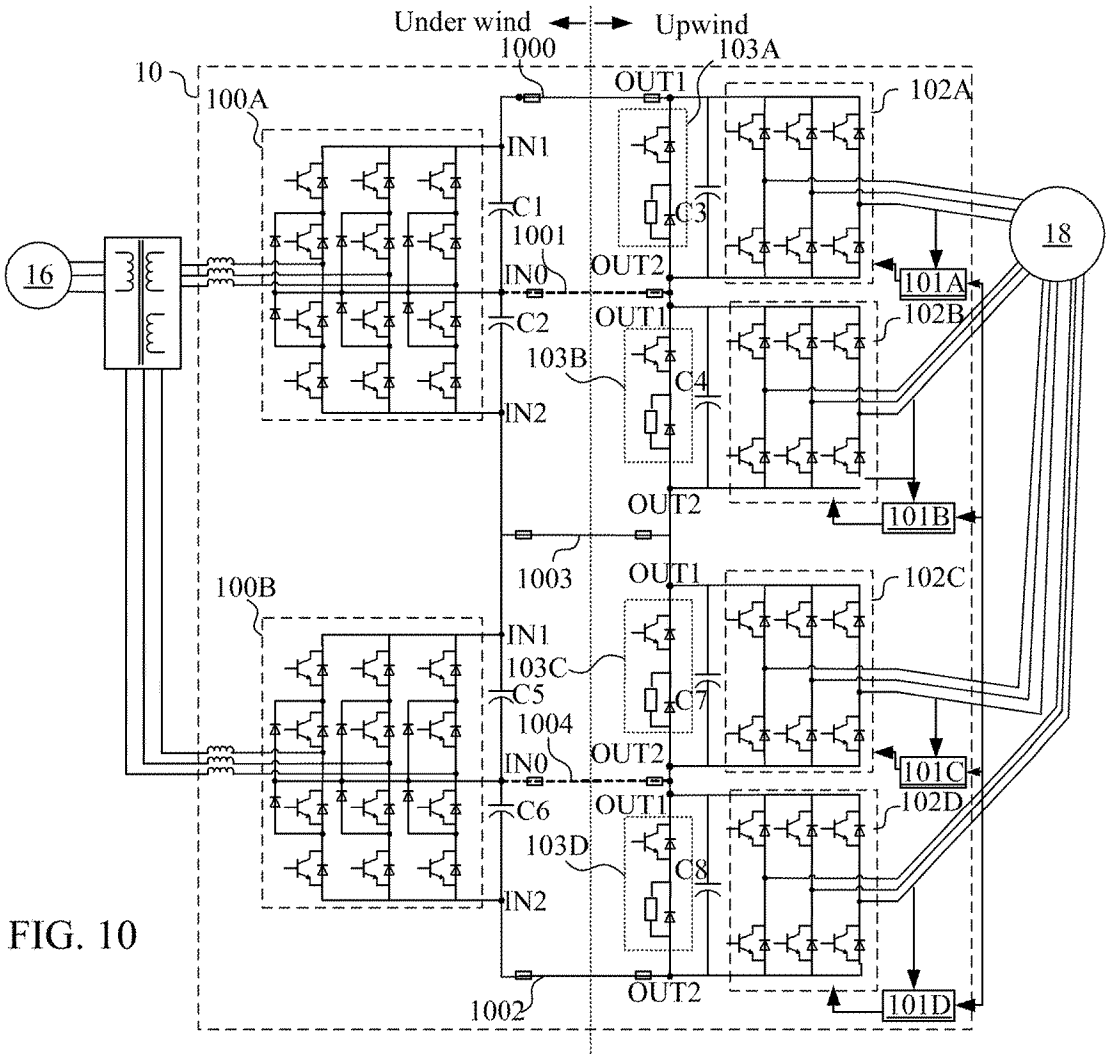
FIG. 10 is a circuit diagram of a wind power converter device in an embodiment of the present disclosure.

Reference is now made to FIG. 10. FIG. 10 is a circuit diagram of a wind power converter device 10 in an embodiment of the present disclosure. The wind power converter device 10 includes grid side converters 100A-100B, generator side converters 102A-102D and a DC bus module. In an embodiment, the grid side converters 100A-100B are three-level converters and include identical components. The grid side converters 100A-100B are electrically coupled to the grid 16 and are electrically coupled in series. The second DC input IN2 of the grid side converter 100A and the first DC input IN1 of the grid side converter 100B are coupled in series.

In an embodiment, the generator side converters 102A-102D include identical components and are two-level converters. The generator side converters 102A-102D are electrically coupled to the generator device 18. Any two of the neighboring generator side converters 102A-102D are coupled in series through the first DC output OUT1 and the second DC output OUT2.

Take the generator side converters 102A and 102B as an example, the second DC output OUT2 of the generator side converter 102A is coupled in series to the first DC output OUT1 of the generator side converter 102B. Similarly, the second DC output OUT2 of the generator side converter 102B is coupled in series to the first DC output OUT1 of the generator side converter 102C. Similarly, the second DC output OUT2 of the generator side converter 102C is coupled in series to the first DC output OUT1 of the generator side converter 102D.

The DC bus module includes DC buses 1000-1004. The DC bus 1000 is electrically coupled to the first DC input IN1 of the grid side converter 108A and the first DC output OUT1 of the generator side converter 102A. The DC bus 1002 is electrically coupled to the second DC input IN2 of the grid side converter 100B and the second DC output OUT2 of the generator side converter 102D. The DC bus 1001 is electrically coupled to the intermediate input IN0 of the grid side converter 100A and the first DC output OUT1 of the generator side converter 102B. The DC bus 1003 is electrically coupled to the second DC input IN2 of the grid side converter 100A and the second DC output OUT2 of the generator side converter 102B. The DC bus 1004 is electrically coupled to the intermediate input IN0 of the grid side converter 100B and the first DC output OUT1 of the generator side converter 102D.

Therefore, the generator side control modules 101A-101D included in the wind power converter device 10 can use the method described in FIG. 5 to control the generator side converters 102A-102D.

In another embodiment, the DC bus module can only include two DC buses 1000 and 1002 that correspond to the grid side converters 100A and 100B and the generator side converters 102A and 102D. The DC bus is not disposed between the intermediate input IN0 of the grid side converter 100A and the first DC output OUT1 of the generator side converter 102B, between the second DC input IN2 of the grid side converter 100A and the second DC output OUT2 of the generator side converter 102B and between the intermediate input IN0 of the grid side converter 100B and the first DC output OUT1 of the generator side converter 102D.

The generator side control modules 101A-101D included in such a wind power converter device 10 can use the methods described in FIG. 2 and FIG. 3 to control the generator side converters 102A-102D.

In an embodiment, the DC bus module further includes bus capacitors C1-C8 each electrically coupled between the first DC input IN1 and the intermediate input IN0 and between the intermediate input IN0 and the second DC input IN2 of the grid side converter 100A-100B and between the first DC output OUT1 and the second DC output OUT2 of the generator side converters 102A-102D to support the voltages of these terminals.

In an embodiment, the wind power converter device 10 further includes chopper circuits 103A-103D. The chopper circuits 103A-103D are respectively disposed between the two ends of the bus capacitors C3, C4, C7 and C8 to perform a voltage balancing protection to the generator side converters 102A-102D.

Figure 11:
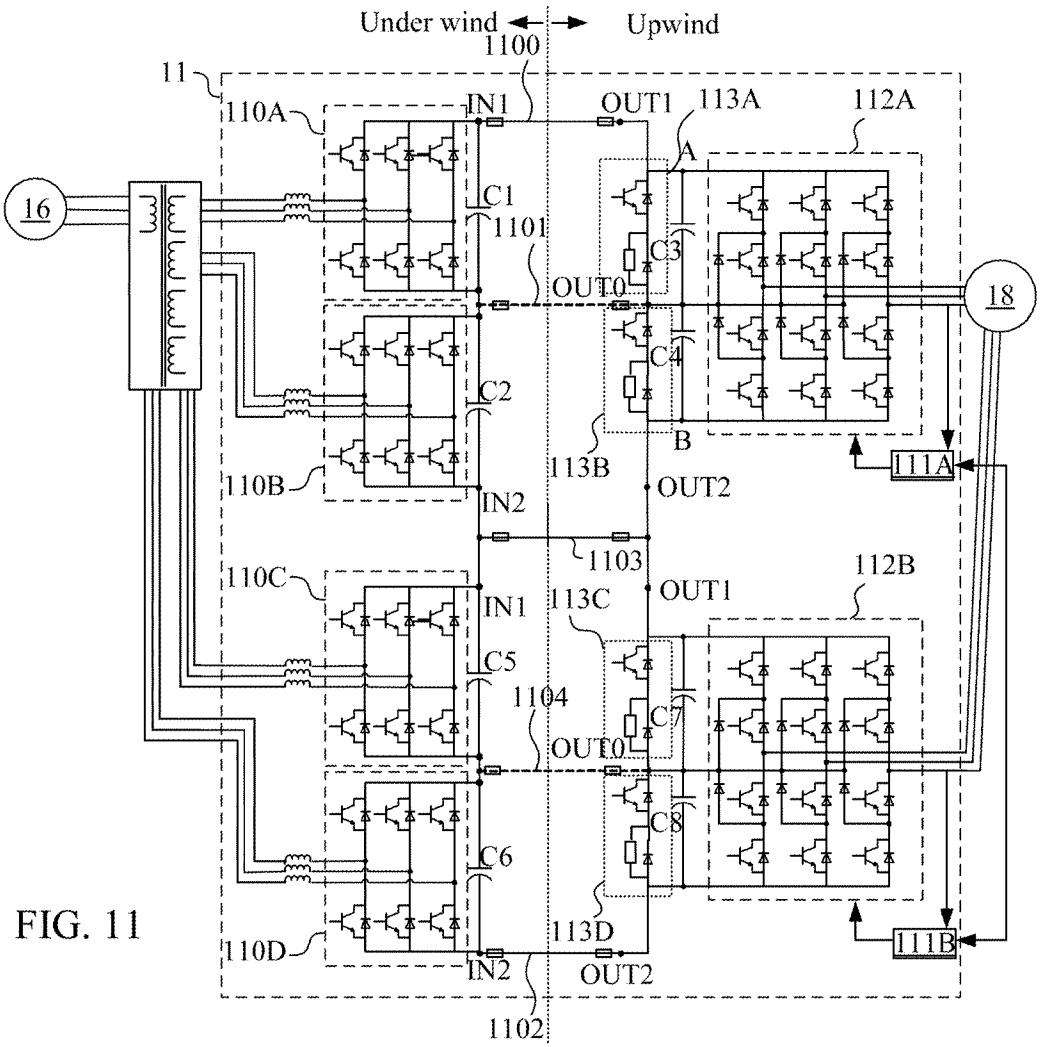
FIG. 11 is a circuit diagram of a wind power converter device in an embodiment of the present disclosure.

FIG. 11 is a circuit diagram of a wind power converter device 11 in an embodiment of the present disclosure.

The wind power converter device 11 includes grid side converters 110A-110D, generator side converters 112A-112B and a DC bus module. In an embodiment, the grid side converters 110A-110D include identical components and are two-level converters. The grid side converters 110A-110D are electrically coupled to the grid 16. Any two of the neighboring grid side converters 110A-110D are coupled in series through the first DC input IN1 and the second DC input IN2. Take the grid side converters 110A and 110B as an example, the second DC input IN2 of the grid side converter 110A is coupled in series to the first DC input IN1 of the grid side converter 110B.

Similarly, the second DC input IN2 of the grid side converter 110B is coupled in series to the first DC input IN1 of the grid side converter 110C. Similarly, the second DC input IN2 of the grid side converter 110C is coupled in series to the first DC input IN1 of the grid side converter 110D.

In an embodiment, the generator side converters 112A-112B include identical components and are three-level converters. The generator side converters 112A-112B are electrically coupled to the generator device 18. The second DC output OUT2 of the generator side converter 112A and the first DC output OUT1 of the generator side converter 1126 are coupled in series.

The DC bus module includes DC buses 1100-1104. The DC bus 1100 is electrically coupled to the first DC input IN1 of the grid side converter 110A and the first DC output OUT1 of the generator side converter 112A. The DC bus 1102 is electrically coupled to the second DC input IN2 of the grid side converter 110D and the second DC output OUT2 of the generator side converter 112B. The DC bus 1101 is electrically coupled to the intermediate output OUT0 of the generator side converter 112A and the first DC input IN1 of the grid side converter 110B. The DC bus 1103 is electrically coupled to the second DC output OUT2 of the generator side converter 112A and the second DC input IN2 of the grid side converter 110B. The DC bus 1104 is electrically coupled to the intermediate output OUT0 of the generator side converter 112B and the first DC output OUT1 of the grid side converter 110D.

Therefore, the generator side control modules 111A-111B included in the wind power converter device 11 can use the method described in FIG. 5 to control the generator side converters 112A-112B.

In another embodiment, the DC bus module can only include two DC buses 1100 and 1102 that correspond to the grid side converters 110A and 110D and the generator side converters 112A and 112B. The DC bus is not disposed between the intermediate output OUT0 of the generator side converter 112A and the first DC input IN1 of the generator side converter 110B, between the second DC output OUT2 of the generator side converter 112A and the second DC input IN2 of the grid side converter 110B and between the intermediate output OUT0 of the generator side converter 112B and the first DC input IN1 of the grid side converter 110D.

In an embodiment, the wind power converter device 11 further includes chopper circuits 113A-113D. The chopper circuits 113A-113D are respectively disposed between the two ends of the bus capacitors C3, C4, C7 and C8 to perform a voltage balancing protection to the generator side converters 112A-112B.

The generator side control modules 111A-111B included in such a wind power converter device 11 can use the methods described in FIG. 2 and FIG. 3 to control the generator side converters 112A-112B.

Therefore, it is appreciated from the embodiments from FIG. 6 to FIG. 11 that the design of the wind power converter device can be adjusted elastically according to the practical demands and is not limited to a specific architecture.

Figure 12:
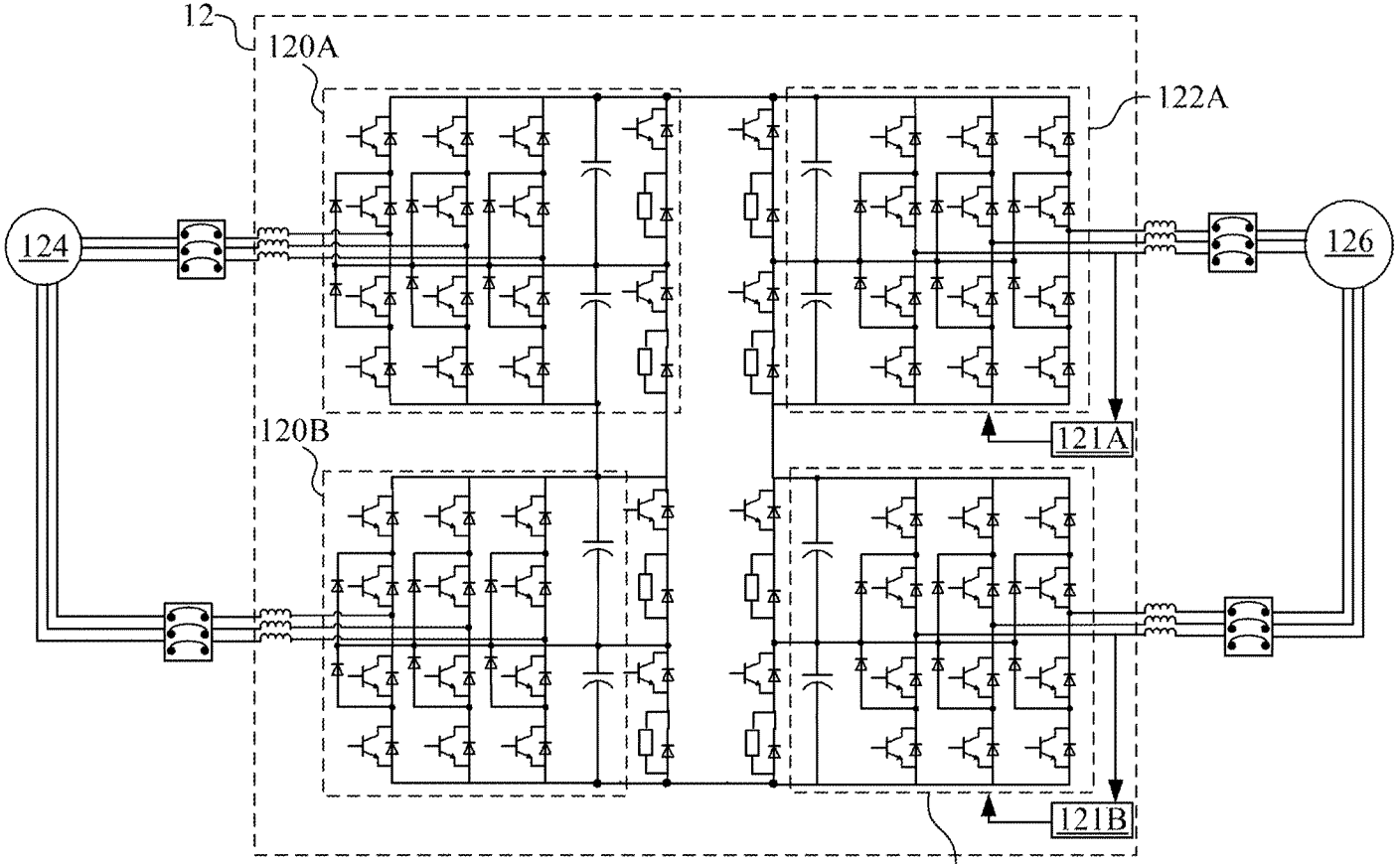
FIG. 12 is a circuit diagram of a converter device in an embodiment of the present disclosure.

FIG. 12 is a circuit diagram of a converter device 12 in an embodiment of the present disclosure.

The architecture of the converter device 12 is similar to that of the wind power converter device 7. However, the first generator side converters 120A-120B included in the converter device 12 are coupled in series and are coupled to a motor device 124. The second generator side converters 122A-122B included in the converter device 12 are coupled in series and are coupled to a generator device 126. The converter device 12 in the present embodiment is used in the condition that the distance between the first generator side converters and the second generator side converters is larger, such as the converter series-parallel system used in the propeller of the ships. Moreover, the converter device 12 includes the control modules 121A and 121B. The method described in FIG. 5 can be used to control the second generator side converters 122A-122B. Converter device includes chopper circuits each is disposed between the two ends of the bus capacitors of the first generator side converters and the second generator side converters.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wind power converter device comprising:

a plurality of grid side converters each comprising a plurality of grid side outputs electrically coupled to a grid, a first direct current (DC) input and a second DC input, wherein the second DC input of one of any two of the neighboring grid side converters is coupled in series to the first DC input of another one of the two neighboring grid side converters;

a plurality of generator side converters each comprising a plurality of generator side inputs electrically coupled to a generator device, a first DC output and a second DC output, wherein the second DC output of one of any two of the neighboring generator side converters is coupled in series to the first DC output of another one of the two neighboring generator side converters; and a DC bus [module] *circuit* electrically coupled between the grid side converters and the generator side converters, wherein the grid side converters comprise a first grid side converter, a second grid side converter and at least one intermediate grid side converter, and the generator side converters comprises a first generator side converter, a second generator side converter and at least one intermediate generator side converter;

the DC bus [module] *circuit* comprises a first DC bus and a second DC bus, wherein the first DC bus is electrically coupled between the first DC input of the first grid side converter and the first DC output of the first generator side converter, and the second DC bus is electrically coupled between the second DC input of the second grid side converter and the second DC output of the second generator side converter, wherein the DC bus [module] *circuit* comprises a plurality of DC buses each electrically coupled to the first DC input of one of the corresponding grid side converters and the first DC output of one of the corresponding generator side converters and to the second DC input of one of the corresponding grid side converters and the second DC output of one of the corresponding generator side converters, wherein the wind power converter device further comprises a plurality of generator side control [modules] *circuits* each to receive a three phase input current amount of the generator side inputs of the generator side converters and a second axis general given current component to generate a three phase voltage control signal accordingly to control the corresponding generator side converters, wherein each of the generator side control [modules] *circuits* comprises:

a current retrieving [unit] *circuit* is configured to retrieve the three phase input current amount;

a first converting [unit] *circuit* is configured to convert the three phase input current amount to a first axis current component and a second axis current component;

a first computing [unit] *circuit* is configured to perform computation to generate a first axis difference according to the first axis current component and a first axis independent given current component;

a second computing [unit] *circuit* is configured to perform computation to generate a second axis difference according to the second axis current component and the second axis general given current component;

a first current control [unit] *circuit* to generate a first axis voltage control signal according to the first axis difference;

a second current control [unit] *circuit* to generate a second axis voltage control signal according to the second axis difference; and a second converting [unit] *circuit* to convert the first axis voltage control signal and the second axis voltage control signal to the three phase voltage control signal.

2. The wind power converter device of claim 1, wherein the DC bus [module] *circuit* comprises a plurality of bus capacitors each electrically coupled between the first DC input and the second DC input of each of the grid side converters and the first DC output and the second DC output of each of the generator side converters.

3. The wind power converter device of claim 2, further comprising a plurality of chopper circuits each electrically coupled to two ends of each of the bus capacitors.

4. The wind power converter device of claim 1, wherein the grid side outputs of the grid side converters are coupled to the grid through a [voltage] transformer.

5. The wind power converter device of claim 1, wherein the generator device comprises a multiple groups of windings each electrically coupled to the generator side inputs of the generator side converters.

[6. The wind power converter device of claim 1, wherein the generator device is a permanent magnet synchronous generator device, an excitation synchronous generator device or an induction generator.]

[7. The wind power converter device of claim 1, wherein the number of the generator side converters is the same as the number of the grid side converters.]

8. The wind power converter device of claim 1, wherein each of the generator side converters is a two-level converter and each of the grid side converters is a two-level converter; or each of the generator side converters is a three-level converter and each of the grid side converters is a three-level converter.

9. The wind power converter device of claim 1, further comprising a plurality of chopper circuit each electrically coupled to the first DC output and the second DC output of the generator side converters.

*10. A wind power converter device comprising:*

*a plurality of grid side converters comprising a first grid side converter and a second grid side converter, each one of the grid side converters comprising a plurality of grid side outputs electrically coupled to a grid, a first direct current (DC) input and a second DC input, wherein the second DC input of the first grid side converter is electrically coupled to the first DC input of the second grid side converter;*

*a plurality of generator side converters comprising a first generator side converter and a second generator side converter, each one of the generator side converters comprising a plurality of generator side inputs electrically coupled to a generator device, a first DC output and a second DC output, wherein the second DC output of the first generator side converter is electrically coupled to the first DC output of the second generator side converter; and*

*a set of DC buses comprising a first DC bus, an intermediate DC bus and a second DC bus,*

*wherein the first DC bus is electrically coupled between the first DC input of the first grid side converter and the first DC output of the first generator side converter, the intermediate DC bus is electrically coupled between the second DC input of the first grid side converter and the second DC output of the first generator side converter and the second DC bus is electrically coupled between the second DC input of the second grid side converter and the second DC output of the second generator side converter;*

*wherein the first grid side converter is coupled in series to the second grid side converter; and*

*the first generator side converter is coupled in series to the second generator side converter.*

*11. The wind power converter device of claim 10, wherein the second DC output of the first generator side converter is coupled in series to the first DC output of the first generator side converter through one or more first bus capacitors; and*

*the second DC input of the second grid side converter is coupled in series to the first DC input of the second grid side converter through one or more second bus capacitors.*

*12. The wind power converter device of claim 10, wherein the generator device comprises multiple groups of windings each electrically coupled to the generator side inputs of corresponding one of the generator side converters.*

*13. The wind power converter device of claim 10, wherein the plurality of generator-side converters are arranged located on a top part of a tower, and the plurality of grid-side converters are arranged on a bottom part of the tower or outside the tower.*

*14. The wind power converter device of claim 13, further comprising a plurality of chopper circuit each electrically coupled to the first DC output and the second DC output of corresponding one of the generator side converters.*

*15. The wind power converter device of claim 10, further comprising a plurality of generator side control circuits comprising a first generator side control circuit and a second generator side control circuit, wherein the first generator side control circuit is configured to receive a control command from an external controller and control the first generator side converter, and the second generator side control circuit is configured to receive the control command from the first generator side control circuit and control the second generator side converter.*

*16. The wind power converter device of claim 15, wherein each of the generator side control circuits receives an electrical signal of the corresponding generator side converter and the control command to generate a control signal accordingly to control the operation state of the corresponding generator side converter.*

*17. The wind power converter device of claim 16, wherein the electrical signal of the corresponding generator side converter is a three phase input current amount of the generator side inputs, the control command is a second axis general given current component, and the control signal is a three phase voltage control signal.*

*18. The wind power converter device of claim 15, wherein each of the generator side control circuits comprises:*

*a current retrieving circuit is configured to retrieve the three phase input current amount;*

*a first converting circuit is configured to convert the three phase input current amount to a first axis current component and a second axis current component;*

*a first computing circuit is configured to perform computation to generate a first axis difference according to the first axis current component and a first axis independent given current component;*

*a second computing circuit is configured to perform computation to generate a second axis difference according to the second axis current component and the second axis general given current component;*

*a first current control circuit to generate a first axis voltage control signal according to the first axis difference;*

*a second current control circuit to generate a second axis voltage control signal according to the second axis difference; and*

*a second converting circuit to convert the first axis voltage control signal and the second axis voltage control signal to the three phase voltage control signal.*

* * * * *